United States Patent
Perry et al.

[11] Patent Number: 6,164,373
[45] Date of Patent: Dec. 26, 2000

[54] SAMPLE CONDITIONING SYSTEM FOR AN OFF-GAS MONITOR PANEL

[75] Inventors: Eric F. Perry, San Ramon; Ray L. Armstrong; Robert Alan Head, both of San Jose, all of Calif.

[73] Assignee: General Electric Company, Schenectady, N.Y.

[21] Appl. No.: 09/329,828

[22] Filed: Jun. 10, 1999

Related U.S. Application Data

[60] Provisional application No. 60/089,732, Jun. 18, 1998.

[51] Int. Cl.$^7$ ........................................... F24F 3/14
[52] U.S. Cl. ..................... 165/222; 165/154; 165/61; 62/93; 95/39; 95/117
[58] Field of Search ..................... 165/154, 111, 165/222, 61, 141; 62/93; 95/39, 117

[56] References Cited

U.S. PATENT DOCUMENTS

| | | | |
|---|---|---|---|
| 3,557,869 | 1/1971 | Hans Welmann | 165/111 |
| 5,538,536 | 7/1996 | Fuentes et al. | 95/45 |
| 5,758,739 | 7/1998 | Baker | 95/39 |
| 5,769,926 | 6/1998 | Lokhandwala et al. | 95/39 |
| 5,871,563 | 6/1998 | Roth et al. | 95/42 |
| 5,964,923 | 10/1999 | Lokhandwala | 95/39 |

*Primary Examiner*—Ira S. Lazarus
*Assistant Examiner*—Terrell McKinnon
*Attorney, Agent, or Firm*—Armstrong Teasdale LLP

[57] ABSTRACT

A sample conditioning apparatus that removes moisture from a saturated gaseous sample and that utilizes the removed moisture for evaporative cooling within the apparatus is described. The sample conditioning apparatus includes a heat exchanger, a condensate drain trap, and a bypass line that directs a portion of the sample to a cooling medium inlet of the heat exchanger. The apparatus also includes a direction changing fitting to direct the condensate from the heat exchanger into a condensate drain trap. The direction changing fitting is coupled to a sample outlet of the heat exchanger and to the condensate drain trap. The direction changing fitting is also coupled to a membrane type moisture separator to prevent any liquid carrying over through to the gas analyzers. The moisture separator is also coupled to a first end of a bypass line, and to a sample line extending between the separator to the gas analyzers. The membrane moisture separator separates liquid moisture from the gaseous sample and directs the liquid into the bypass line. A portion of the gaseous sample is also directed through the membrane separator to the bypass line. Additionally, the condensate drain trap outlet is coupled to the bypass line.

20 Claims, 3 Drawing Sheets

SAMPLE CONDITIONING SYSTEM FOR AN OFF-GAS MONITOR PANEL

CROSS-REFERENCE TO RELATED APPLICATIONS

This application claims the benefit of U.S. Provisional Application No. 60/089,732, filed Jun. 18, 1998.

BACKGROUND OF THE INVENTION

This invention relates generally to nuclear reactors and more particularly, to the hydrogen water chemistry system in a boiling water nuclear reactor.

Boiling water nuclear reactors contain a plurality of systems to monitor the workings of the reactor. One important system is the hydrogen water chemistry system used to mitigate stress corrosion in the reactor pressure vessel. During the process of converting water to steam in the reactor, a portion of the water may be broken down into hydrogen and oxygen ($2H_2O \rightarrow 2H_2 + O_2$). The build-up of this dissolved hydrogen and oxygen is undesirable because it may contribute to the onset and acceleration of stress corrosion cracking of stainless steel piping and components in the reactor pressure vessel. The addition of hydrogen to the feed water causes a reduction in dissolved oxygen within the reactor internals and recirculation piping, and lowers the radiolytic production of hydrogen and oxygen in the vessel core region. To ensure that the hydrogen added to the feedwater is properly combined with oxygen to produce water, oxygen is added to the off-gas system upstream of the recombiners. To ensure stoichiometric balance of hydrogen and oxygen is maintained, hydrogen water chemistry systems typically include hydrogen and oxygen analyzers to monitor the recombiner exit. Process conditions at the sample location are saturated with temperatures in the range of about 130° F. to 200° F. Condensation from a gaseous sample at the elevated temperatures present in the system will destroy many types of oxygen and hydrogen gas analyzers.

It would be desirable to provide a system to remove moisture from a saturated gaseous sample to protect the sensors and electronic components of the oxygen and hydrogen gas analyzers used in a BWR hydrogen water chemistry system. It would further be desirable to provide a system to remove moisture from a saturated gaseous sample in a BWR that requires minimal external electrical, utility, or equipment support.

BRIEF SUMMARY OF THE INVENTION

These and other objects may be attained by a sample conditioning apparatus that removes moisture from a saturated gaseous sample and that utilizes the removed moisture for evaporative cooling within the apparatus. The sample conditioning apparatus includes a heat exchanger, a condensate drain trap, a membrane type moisture separator, and a bypass line that directs a portion of the sample to a cooling medium inlet of the heat exchanger.

The heat exchanger in one embodiment of the present invention is a concentric tube, counter-flow heat exchanger. The heat exchanger includes an elongate outer tube and an elongate inner tube located inside the outer tube. There is no flow communication between the inner and outer tubes in the heat exchanger. The saturated gaseous sample which includes entrained water enters the inner tube of the heat exchanger through a sample inlet located at a first end of the exchanger, and exits the exchanger at the opposite end of the inner tube through a sample outlet. The cooling medium enters the outer tube of the heat exchanger through an inlet located at a second end of the heat exchanger and exits the exchanger through an outlet located at the opposite end of the outer tube. The cooling medium outlet is normally maintained at a vacuum of at least 10 inches of mercury (Hg), preferably at least 20 inches of Hg.

The apparatus also includes a direction changing fitting to direct the condensate from the heat exchanger into a condensate drain trap. The direction changing fitting is coupled to the sample outlet of the heat exchanger and to the condensate drain trap. The direction changing fitting is also coupled to the membrane type moisture separator to prevent any liquid carrying over through to the gas analyzers. The moisture separator is also coupled to a first end of a bypass line, and to a sample line extending between the separator to the gas analyzers. The membrane moisture separator separates liquid moisture from the gaseous sample and directs the liquid into the bypass line. A portion of the gaseous sample is also directed through the membrane separator to the bypass line.

The bypass line includes a flow control valve to regulate the flow through the bypass line. A second end of the bypass line is coupled to the cooling medium inlet of the heat exchanger. Additionally, the condensate drain trap outlet is coupled to the bypass line.

The above described sample conditioning apparatus may be utilized to remove moisture from a saturated gaseous sample taken from the off-gas in a boiling water nuclear reactor. The moisture laden sample is directed to the inner tube of the heat exchanger through the sample inlet. The sample is cooled in the heat exchanger causing a portion of the moisture to condense. The sample then exits the heat exchanger through the sample outlet at the opposite end of the inner tube.

The sample is then directed through the direction changing fitting. The fitting causes the gaseous sample and condensate to enter the condensate drain trap to capture the condensate. The gaseous sample then exits the condensate drain trap through the direction changing fitting leaving the condensate in the condensate drain trap. When the condensate drain trap fills with water, a ball float causes the condensate drain trap outlet to open to permit the water to drain from the condensate drain trap.

After the gaseous sample leaves the condensate drain trap, it is directed to the membrane type moisture separator. The membrane separator prevents liquid carryover from passing through the gas analyzers. The separated moisture and a portion of the sample stream is directed through the membrane separator into the bypass line. The remainder of the gaseous sample is directed through a sample line to the gas analyzers.

The bypass sample and the moisture are directed to the inlet of the outer tube of the heat exchanger. Additionally, the outlet from the condensate drain trap is coupled to the bypass line, and the water that is drained from the condensate drain trap is directed into the bypass line and to the outer tube of the heat exchanger along with the bypass sample.

A vacuum is maintained on the outer tube of the heat exchanger by having the outlet of the outer tube be under a vacuum of at least 10 inches of Hg, preferably at least 20 inches of Hg. As the moisture from the condensate drain trap enters the lower pressure bypass line, the moisture evaporates and cools the bypass flow entering the outer tube of the heat exchanger. As the cooled bypass sample is drawn through the outer tube of the heat exchanger it contacts the warm inner tube of the heat exchanger, thereby removing heat energy from the gaseous sample flowing in the inner tube. The removal of heat energy from the sample flowing through the inner tube causes the sample to drop in temperature and, as a result, causes a portion of the moisture in the sample to condense.

The bypass sample then exits the outer tube of the heat exchanger through the outlet and is returned through a line back to the main condenser in the boiling water reactor power plant.

The sample conditioning apparatus described above permits the removal of moisture from a gaseous sample prior to the sample being directed to gas analyzers to protect the gas analyzers and their electrical components. The apparatus can reduce the relative humidity of the saturated gaseous sample to about 50 percent, and reduce the temperature of the sample stream to a temperature of about 60° F. to about 75° F. The apparatus does not require external electrical, utility, or equipment support to operate properly.

DETAILED DESCRIPTION OF THE INVENTION

Figure 1:
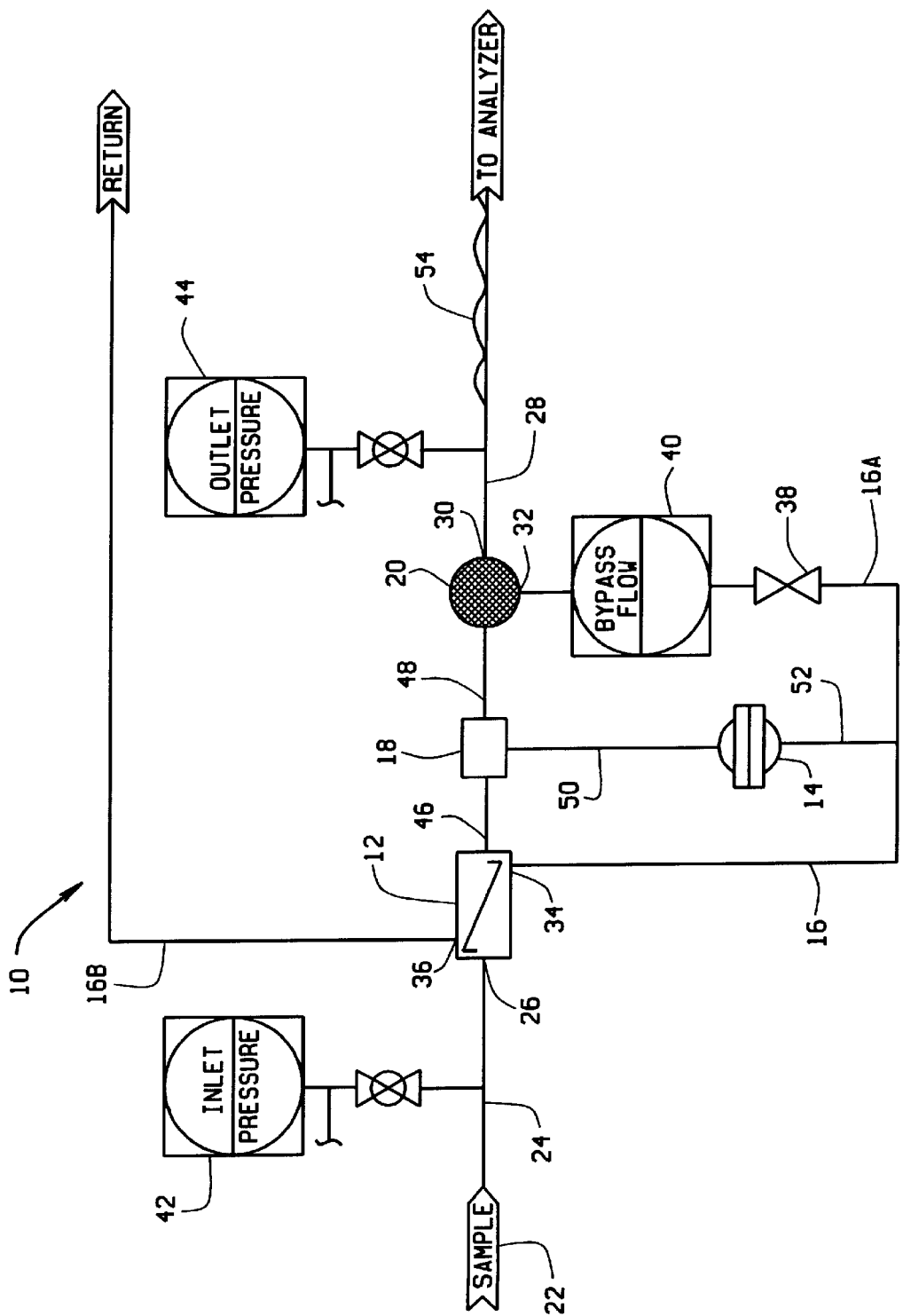
FIG. 1 is a schematic of a sample conditioning apparatus in accordance with one embodiment of the present invention.

FIG. 1 is a schematic of a sample conditioning apparatus 10 in accordance with one embodiment of the present invention. Apparatus 10 includes a heat exchanger 12, a condensate drain trap 14, a bypass line 16, a flow direction changing fitting 18, and a membrane type moisture separator 20.

A gaseous sample flow 22 enters heat exchanger 12 through conduit 24. Typically, gaseous sample flow 22 includes entrained water. Conduit 24 extends from the off-gas sampling location downstream of the recombiners (not shown) to a sample inlet 26 of heat exchanger 12. Sample flow 22 exits apparatus 10 through conduit 28 which extends from an outlet 30 of membrane moisture separator 20 to the gas analyzers (not shown).

Bypass line 16 includes two sections 16A and 16B. Section 16A extends from an outlet 32 of membrane separator 20 to a cooling medium inlet 34 of heat exchanger 12. Section 16B extends from a cooling medium outlet 36 of heat exchanger 12 to a sample return inlet at the main condenser (not shown) of a boiling water reactor power plant. Bypass line 16A includes a flow control valve 38 to regulate flow through bypass line 16, and includes a bypass flow indicator 40. Flow indicator 40 may be any commercially available flow monitor. In one embodiment, flow monitor 40 is a Krohne flow indicator, part number DK34V0760A231-090, commercially available from Krohne America, Inc., Peabody, Mass.

Pressure gauge 42 is coupled to conduit 24 to measure the pressure of gaseous sample flow 22 prior to entering heat exchanger 12. Pressure gauge 44 is coupled to conduit 28 to measure the pressure of sample flow 22 after exiting heat exchanger 12. Typically, the pressure in conduit 24 is about one atmosphere. Conduit 28 is typically maintained at a vacuum of at least 10 inches of Hg, preferably at least 20 inches Hg to facilitate moving sample flow 22 to the gas analyzers (not shown).

Direction changing fitting 18 is coupled to a sample outlet 46 of heat exchanger 12, and to an inlet 50 of condensate drain trap 14. Direction changing fitting 18 is also coupled to an inlet 48 of membrane type moisture separator 20. Condensate drain trap outlet 52 is coupled to bypass line 16A.

Membrane separator 20 prevents liquid carryover from heat exchanger 12 from passing through to the gas analyzers (not shown). Membrane separator 20 may be any commercially available membrane separator capable of passing a sample flow of 4 standard cubic feet per hour (SCFH) at 1 atmosphere and 70° F. with a maximum differential pressure drop of 0.25 pounds per square inch (psi). In one embodiment, membrane separator 20 is a Genie membrane separator, part number 130-002-SS, commercially available from A+ Corporation.

Additionally, conduit 28 may be wrapped with heat tracing tape 54 to raise the temperature of sample flow 22 and thus lower the relative humidity of sample flow 22. At a lower relative humidity, the dew point of sample flow 22 is lowered thus lessening the possibility of condensate forming in the gas analyzers. Typically, conduit 28 is heated to a temperature of about 90° F. to about 140° F., preferably about 110° F. to about 125° F. Heat tracing tape 52 may be, for example, 10 watts per foot heat tracing tape, part number 10QTVR1-CT, commercially available from Raychem Corporation, Menlo Park, Calif.

Figure 2:
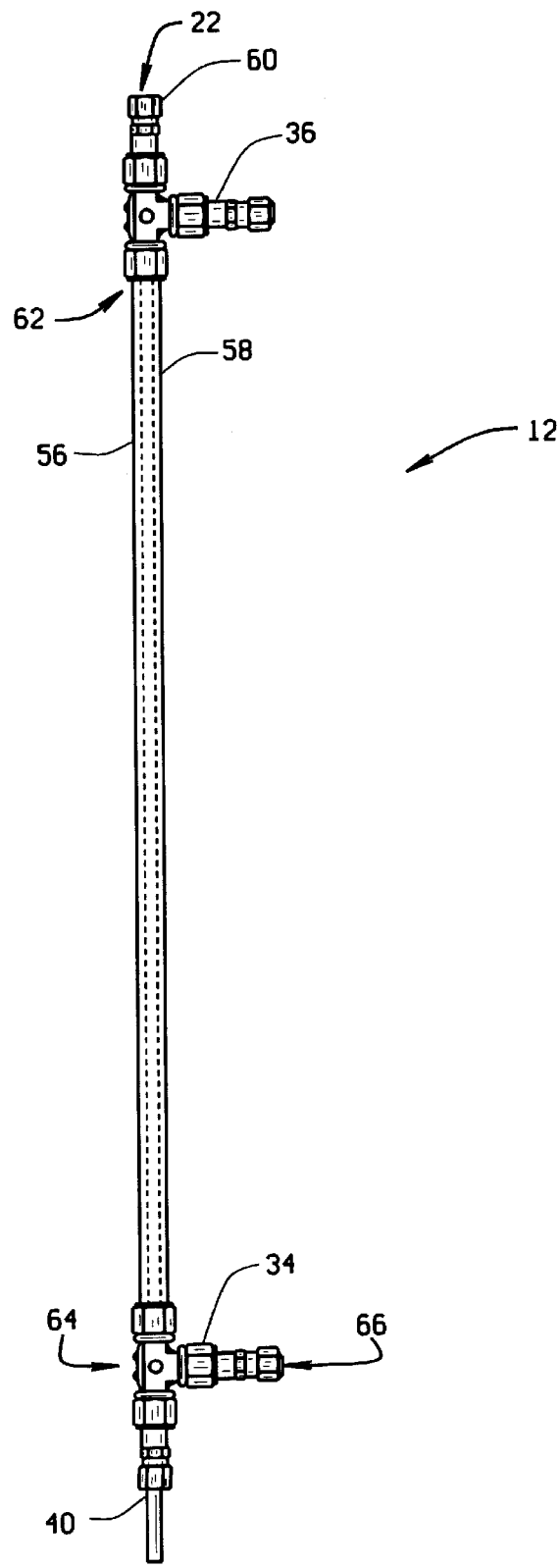
FIG. 2 is a side view of the heat exchanger shown in the schematic in FIG. 1.

Referring to FIG. 2, heat exchanger 12, in one embodiment of the present invention, is a concentric tube, counter-flow heat exchanger. Heat exchanger 12 includes an elongate outer tube 56 and an elongate inner tube 58 located inside outer tube 56. There is no flow communication between inner tube 58 and outer tube 56 in heat exchanger 12. Saturated gaseous sample 22 enters inner tube 58 of heat exchanger 12 through a sample inlet 60 located at a first end 62 of exchanger 12, and exits exchanger 12 at a second end 64 of exchanger 12 through sample outlet 46. The cooling medium 66 enters outer tube 56 of heat exchanger 12 through inlet 34 located at second end 64 of heat exchanger 12 and exits exchanger 12 through outlet 36 located at first end 62. Cooling medium outlet 36 is normally maintained at a vacuum of at least 10 inches of Hg, preferably at least 20 inches of Hg. In an alternate embodiment, sample inlet 60 and cooling medium inlet 34 are located at first end 62 of heat exchanger 12, and sample outlet 46 and cooling medium outlet 36 are located at second end 64 of heat exchanger 12.

Figure 3:
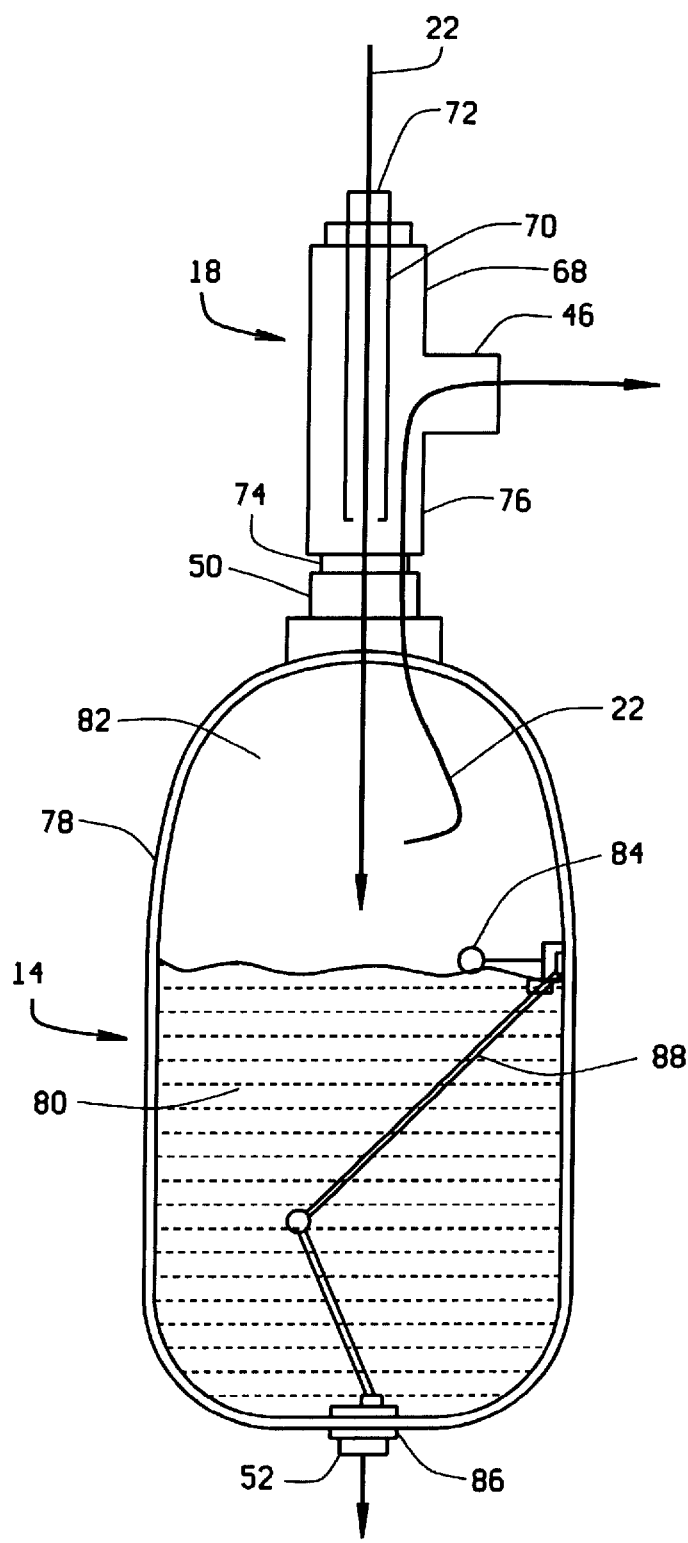
FIG. 3 is a side view with parts cut away of the direction changer and condensate drain trap shown in the schematic in FIG 1.

FIG. 3 shows direction changing fitting 18 coupled to inlet 50 of condensate drain trap 14. Particularly, fitting 18 includes a T-shaped body 68 having a bore 70 extending through body 68 from inlet 72 to outlet 74. Direction changing fitting outlet 74 is coupled to condensate drain inlet 50. Sample flow 22 enters direction changing fitting 18 through inlet 72 and flows through fitting 18 and into condensate drain trap 14. Sample flow 22 exits condensate drain trap 14 through annulus 76 and outlet 46 of direction changing fitting 18. When sample flow 22 enters condensate drain trap 14, sample 22 contains both water laden gas and condensate produced in heat exchanger 12. The condensate is trapped in drain trap 14 and the gaseous portion of sample flow 22 exits through annulus 76 and outlet 46 of fitting 18, flowing to membrane separator 20 (shown in FIG. 1).

Condensate drain trap 14 includes a body 76, an inlet 50, and an outlet 52. Body 78 of drain trap 14 is configured to hold water 80. Above water 80 is an air or gas space 82. A ball float 84 coupled to a drain valve 86 regulates the water level inside drain trap 14. Ball float 84 is coupled to an articulated arm 88 which is in turn coupled to drain valve 86. When the water level rises above a predetermined level, ball float 84 rises causing articulated arm 88 to open drain valve 86 allowing water 80 to exit drain trap 14 through outlet 52 and flow into bypass line 16A. Condensate drain trap 14 may for example be stainless steel condensate trap, part number 11-LD, commercially available from Armstrong International, Inc., Three Rivers, Mich.

Sample conditioning apparatus 10 may be utilized to remove moisture from saturated gaseous sample flow 22 taken from the off-gas downstream of the recombiners in a boiling water nuclear reactor. Typically, gaseous sample flow 22 is saturated with water and is at a temperature of about 130° F. to about 200° F. Moisture laden sample 22 is directed to inner tube 58 of heat exchanger 12 through sample inlet 60. Sample flow 22 is cooled in heat exchanger 12 causing a portion of the moisture to condense. Sample flow 22 then exits heat exchanger 12 through sample outlet 46 at second end 64 of heat exchanger 12.

Sample flow 22 is then directed through direction changing fitting 18. Fitting 18 causes gaseous sample 22 and condensate to enter condensate drain trap 14 to capture the condensate. Gaseous sample 22 then exits condensate drain trap 14 through direction changing fitting 18 leaving the condensate in condensate drain trap 14. When condensate drain trap 14 fills with water 80, ball float 84 rises causing condensate drain trap valve 86 to open to permit water 80 to drain from condensate drain trap 14 into bypass line 16A.

After gaseous sample 22 leaves condensate drain trap 14, it is directed to membrane type moisture separator 20. Membrane separator 20 prevents liquid carryover from passing through the gas analyzers (not shown). The separated moisture and a portion of sample flow 22 is directed through membrane separator 20 into bypass line 16A. The remainder of gaseous sample flow 22 is directed through a sample line 28 to the gas analyzers (not shown).

The contents of bypass line 16A are directed to inlet 34 of outer tube 56 of heat exchanger 12 and form cooling medium 66. Water 80 drained from condensate drain trap 14 is directed into bypass line 16A and to outer tube 56 of heat exchanger 12 and is added to cooling medium 66. A vacuum is maintained on outer tube 56 of heat exchanger 12 by pulling a vacuum on outlet 36 of outer tube 56 and return conduit 16B of at least 10 inches of Hg, preferably at least 20 inches of Hg. As the moisture from condensate drain trap 14 enters lower pressure bypass line 16A, the moisture evaporates and cools the contents of bypass line 16A which is then directed to outer tube 56 of heat exchanger 12. The cooled contents of bypass line 16A forms cooling medium 66. As cooling medium 66 is drawn through outer tube 56 of heat exchanger 12 cooling medium 66 contacts warm inner tube 58 of heat exchanger 12, thus removing heat energy from gaseous sample 22 flowing in inner tube 58. The removal of heat energy from sample 22 flowing through inner tube 58 causes sample 22 to drop in temperature and, as a result, causes a portion of the moisture in sample 22 to condense.

Cooling medium 66 then exits outer tube 56 of heat exchanger 12 through outlet 36 and is returned through line 16B back to the main condenser in the boiling water reactor power plant.

Sample conditioning apparatus 10 described above permits the removal of moisture from gaseous sample flow 22 prior to sample 22 being directed to gas analyzers. The removal of moisture from sample flow 22 protects the gas analyzers and their electrical components. Apparatus 10 can reduce the relative humidity of saturated gaseous sample 22 to about 50 percent, and reduce the temperature of sample flow to an ambient temperature of about 60° F. to about 75° F. Additionally, apparatus 10 does not require external electrical, utility, or equipment support to operate properly.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

We claim:

1. A sample conditioning apparatus for protecting gas analyzers comprising:

a heat exchanger having a sample inlet, a sample outlet, a cooling medium inlet, and a cooling medium outlet;

a condensate drain trap having an inlet and an outlet, said inlet coupled to said sample outlet of said heat exchanger;

a bypass line coupled at a first end to said sample outlet of said heat exchanger and coupled at a second end to said cooling medium inlet, wherein said condensate drain trap outlet is coupled to said bypass line.

2. An apparatus in accordance with claim 1 wherein said heat exchanger comprises a concentric tube heat exchanger comprising an elongate outer coolant tube and an elongate inner sample tube located inside said outer tube, said sample inlet and sample outlet coupled to said inner tube at opposing ends of said inner tube, and said cooling medium inlet and cooling medium outlet coupled to said outer tube at opposing ends of said outer tube.

3. An apparatus in accordance with claim 2 further comprising a direction changing fitting coupled to said sample outlet and to said condensate drain trap.

4. An apparatus in accordance with claim 3 further comprising a membrane type moisture separator coupled to said direction changing fitting, to said bypass line and to a sample line extending between said membrane separator and a gas analyzer, wherein extracted moisture is directed to said bypass line.

5. An apparatus in accordance with claim 4 wherein said sample line is heated.

6. An apparatus in accordance with claim 5 wherein said sample line is heated between about 90° F. to about 140° F.

7. An apparatus in accordance with claim 5 wherein said sample line is heated between about 110° F. to about 125° F.

8. An apparatus in accordance with claim 1 wherein said cooling medium outlet is under a vacuum.

9. An apparatus in accordance with claim 8 wherein said cooling medium outlet is under a vacuum of at least 10 inches of mercury.

10. An apparatus in accordance with claim 8 wherein said cooling medium outlet is under a vacuum of at least 20 inches of mercury.

11. An apparatus in accordance with claim 2 wherein said sample inlet is located at a first end of said heat exchanger and said cooling medium inlet is located at a second end of said heat exchanger so that the flow of a gaseous sample through said heat exchanger is counter to the flow of a cooling medium through said heat exchanger.

12. An apparatus in accordance with claim 2 wherein said sample inlet is located at a first end of said heat exchanger and said cooling medium inlet is located at a first end of said heat exchanger so that the flow of a gaseous sample through said heat exchanger is parallel to the flow of a cooling medium through said heat exchanger.

13. A method of removing moisture from a gaseous sample flow using a sample conditioning apparatus comprising a heat exchanger, a condensate drain trap, a membrane type moisture separator, and a bypass line extending from the membrane separator to a cooling medium inlet of the heat exchanger, said method comprising the steps of:

provgiding a moisture containing gaseous sample flow to the sample conditioning apparatus;

condensing a portion of the moisture in the sample flow in the heat exchanger forming condensate;

collecting the condensate in a condensate drain trap, and directing the condensate into the bypass line;

flowing the sample through the membrane separator; and diverting a portion of the sample from the membrane separator into the bypass line to be returned to the heat exchanger and used as a cooling medium.

14. A method in accordance with claim 13 wherein the heat exchanger comprises a concentric tube heat exchanger comprising an elongate outer coolant tube and an elongate inner sample tube located inside the outer tube, a sample inlet and a sample outlet coupled to the inner tube at opposing ends of the inner tube, and a cooling medium inlet and cooling medium outlet coupled to the outer tube at opposing ends of the outer tube.

15. A method in accordance with claim 14 wherein the sampling conditioning apparatus further comprises a direction changing fitting coupled to the sample outlet and to the condensate drain trap, and wherein the membrane type moisture separator is coupled to the direction changing fitting, to the bypass line and to a sample line extending between the membrane separator and a gas analyzer, extracted moisture from the membrane separator is directed to the bypass line.

16. A method in accordance with claim 15 wherein condensing a portion of the moisture in the sample flow comprises the steps of:

maintaining a vacuum on the sample outlet and the cooling medium outlet of at least 10 inches of Hg; and flowing the cooling medium in the bypass line into and through the outer tube of the heat exchanger so that the moisture and condensate flowing in the cooling medium contacts an outer surface of the inner tube of the heat exchanger and flash evaporates, removing heat energy from the sample flowing in the inner tube, lowering the sample temperature and condensing a portion of the moisture in the sample flow.

17. A method in accordance with claim 15 wherein the sample line is heated between about 110° F. to about 125° F.

18. A method in accordance with claim 16 wherein the sample outlet and the cooling medium outlet are under a vacuum of at least 20 inches of mercury.

19. A method in accordance with claim 14 wherein the sample inlet is located at a first end of said heat exchanger and the cooling medium inlet is located at a second end of the heat exchanger so that the flow of a gaseous sample through said the exchanger is counter to the flow of a cooling medium through the heat exchanger.

20. A method in accordance with claim 14 wherein the sample inlet is located at a first end of the heat exchanger and the cooling medium inlet is located at a first end of the heat exchanger so that the flow of a gaseous sample through the heat exchanger is parallel to the flow of a cooling medium through the heat exchanger.

* * * * *